United States Patent
Babbage, II et al.

(10) Patent No.: US 10,111,269 B2
(45) Date of Patent: Oct. 23, 2018

(54) MULTI-GIGABIT WIRELESS TUNNELING SYSTEM

(71) Applicant: Lattice Semiconductor Corporation, Portland, OR (US)

(72) Inventors: David Noel Babbage, II, Saratoga, CA (US); Chinh Huy Doan, San Jose, CA (US); Mark Graham Forbes, San Carlos, CA (US); Brian Henry John, San Jose, CA (US); Nishit Kumar, San Jose, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 190 days.

(21) Appl. No.: 15/073,398

(22) Filed: Mar. 17, 2016

(65) Prior Publication Data
US 2016/0278142 A1  Sep. 22, 2016

Related U.S. Application Data

(60) Provisional application No. 62/135,007, filed on Mar. 18, 2015.

(51) Int. Cl.
*H04W 76/10* (2018.01)
*H04W 72/04* (2009.01)
(Continued)

(52) U.S. Cl.
CPC .......... *H04W 76/12* (2018.02); *H04L 25/00* (2013.01); *H04W 76/14* (2018.02)

(58) Field of Classification Search
CPC .... H04L 25/00; H04W 76/022; H04W 76/023
See application file for complete search history.

(56) References Cited

U.S. PATENT DOCUMENTS

| | | | |
|---|---|---|---|
| 2005/0027889 A1* | 2/2005 | Sandulescu | G06F 13/4045 709/250 |
| 2005/0138229 A1* | 6/2005 | Sartore | G06F 13/385 710/15 |

(Continued)

FOREIGN PATENT DOCUMENTS

WO   WO 2010/090732 A1   8/2010

OTHER PUBLICATIONS

PCT International Search Report and Written Opinion, PCT Application No. PCT/US2016/023220, dated Jun. 28, 2016, 16 pages.
(Continued)

*Primary Examiner* — Kashif Siddiqui
(74) *Attorney, Agent, or Firm* — Fenwick & West LLP

(57) ABSTRACT

A disclosed wireless tunneling system tunnels communications between two processing apparatuses through a wireless link, while maintaining compliance of the communications between the two processing apparatuses with a wired communication protocol. In one embodiment, the wireless tunneling system includes two wireless tunneling apparatuses that communicate with each other through the wireless link. A local wireless tunneling apparatus is coupled to a local processing apparatus through a wired connection and a remote wireless tunneling apparatus is coupled to the remote processing apparatus through another wired connection. In one aspect, the local wireless tunneling apparatus predicts a state of the remote processing apparatus, and mirrors the predicted state of the remote processing apparatus. Mirroring the state based on the prediction enables high speed data rate tunneling between the two processing apparatuses through the wireless link without a delay associated with the wireless tunneling apparatuses affecting the high speed data rate tunneling.

18 Claims, 6 Drawing Sheets

(51) Int. Cl.
*H04W 76/12* (2018.01)
*H04L 25/00* (2006.01)
*H04W 76/14* (2018.01)

(56) References Cited

U.S. PATENT DOCUMENTS

| | | |
|---|---|---|
| 2008/0205417 A1 | 8/2008 | Li |
| 2008/0215773 A1* | 9/2008 | Christison ............. G06F 13/387 |
| | | 710/62 |
| 2010/0169523 A1 | 7/2010 | Dunstan et al. |
| 2011/0087903 A1* | 4/2011 | MacDougall ............. G06F 1/26 |
| | | 713/310 |
| 2011/0205444 A1 | 8/2011 | Yamamoto et al. |
| 2011/0317595 A1 | 12/2011 | Kanda et al. |
| 2013/0007324 A1* | 1/2013 | Moore ................... G06F 1/3215 |
| | | 710/200 |
| 2013/0010849 A1 | 1/2013 | Shimizu et al. |
| 2013/0051440 A1 | 2/2013 | Rofougaran |
| 2013/0124762 A1 | 5/2013 | Tamir et al. |
| 2013/0287077 A1 | 10/2013 | Fernando et al. |
| 2014/0040486 A1 | 2/2014 | Christie |
| 2014/0122752 A1 | 5/2014 | Toivanen et al. |
| 2014/0219191 A1 | 8/2014 | Stephens et al. |
| 2016/0198410 A1* | 7/2016 | Cherniavsky ..... H04W 52/0229 |
| | | 370/278 |
| 2016/0216757 A1 | 7/2016 | Kim et al. |
| 2016/0334837 A1* | 11/2016 | Dees ....................... H04L 67/16 |

OTHER PUBLICATIONS

PCT International Search Report and Written Opinion, PCT Application No. PCT/US2016/023199, dated Jul. 8, 2016, 11 pages.

* cited by examiner

MULTI-GIGABIT WIRELESS TUNNELING SYSTEM

CROSS-REFERENCE TO RELATED APPLICATION

This application claims priority under 35 U.S.C. § 119(e) from U.S. Provisional Patent Application No. 62/135,007, entitled "Wireless Tunneling System" filed on Mar. 18, 2015, which is incorporated by reference herein in its entirety.

BACKGROUND

1. Field of the Disclosure

Embodiments of the present disclosure generally relate to the field of wireless communication and, more particularly, to wireless tunneling of a wired communication protocol.

2. Description of the Related Art

In a wireless tunneling system, data that is traditionally communicated over a wired communication link is instead tunneled through a wireless channel. Conventionally, wireless communications are substantially slower than communications over wired links. Accordingly, conventional wireless systems are incapable of tunneling high speed protocol, for example, Universal Serial Bus (USB), High-Definition Media Interface (HDMI), and DisplayPort (DP) having multi-Gigabit data rates.

SUMMARY

A disclosed wireless tunneling system tunnels communications between two processing apparatuses through a wireless link, while maintaining compliance of the communications between the two processing apparatuses.

In one embodiment, the wireless tunneling system includes two wireless tunneling apparatuses that communicate with each other through the wireless link. A local wireless tunneling apparatus is coupled to a local processing apparatus through a wired connection and a remote wireless tunneling apparatus is coupled to the remote processing apparatus through another wired connection. The two processing apparatuses may communicate with each other through the low-latency wireless link using the two wireless tunneling apparatuses as if the two processing apparatuses were connected through wired connections.

In one embodiment, the local wireless tunneling apparatus includes a wireless receiver, a processing component state machine, and an interface circuit. The wireless receiver is configured to receive a wireless receive signal from the remote wireless tunneling apparatus, and downconvert the wireless receive signal to generate a baseband signal from the wireless receive signal. The processing component state machine is configured to predict a remote processing state of the remote processing apparatus based on the baseband signal. The interface circuit is coupled to the local processing apparatus and configured to (i) generate an output signal conforming to the wired communication protocol based on the predicted remote processing state and the baseband signal and (ii) provide the output signal to the local processing apparatus through the wired communication protocol.

In one or more embodiments, the local wireless tunneling apparatus further includes a wireless transmitter configured to (i) receive an input signal from the local processing apparatus to generate another baseband signal, (ii) upconvert said another baseband signal to generate a wireless transmit signal and (iii) transmit the wireless transmit signal. The processing component state machine may control a power state of the receiver or the transmitter based on one or more of: (a) current state of the processing component state machine, (b) inputs received from the local processing apparatus, and (c) the predicted remote processing state. The processing component state machine may be further configured to map one or more local processing states of the local processing apparatus to a single state of the processing component state machine, and generate a state signal indicative of a local processing state of the local processing apparatus based on the single state. The transmitter may be further configured to encode the baseband signal with the state signal indicative of the local processing state of the local processing apparatus.

In one or more embodiments, the local wireless tunneling apparatus further includes a wireless component state machine configured to determine a wireless component state of the wireless receiver based on its own current state and the predicted remote processing state of the remote processing apparatus. The wireless component state machine may control an operation mode of the wireless receiver according to the wireless component state determined based on its own current state and the predicted remote processing state of the remote processing apparatus.

In one or more embodiments, the baseband signal is encoded with a state signal indicative of a prior state of the remote processing apparatus. The processing component state machine may be configured to predict the remote processing state of the remote processing apparatus based on the state signal of the baseband signal.

In one or more embodiments, the processing component state machine is configured to predict the remote processing state of the remote processing apparatus based on a portion of the baseband signal corresponding to the wireless receive signal.

In one or more embodiments, the processing component state machine is configured to predict the remote processing state of the remote processing apparatus based on one or more local processing states of the local processing apparatus.

In one or more embodiments, a method of wirelessly tunneling communications between a local processing apparatus and a remote processing apparatus while maintaining compliance of the communications between the local processing apparatus and the remote processing apparatus with a wired communication protocol is disclosed. The method includes: receiving, by a wireless receiver, a wireless receive signal from a remote wireless tunneling apparatus; downconverting, by the wireless receiver, the wireless receive signal to generate a baseband signal from the wireless receive signal; predicting, by a processing component state machine, a remote processing state of the remote processing apparatus based on the baseband signal; generating, by an interface circuit coupled to the local processing apparatus, an output signal conforming to the wired communication protocol based on the predicted remote processing state and the baseband signal; and providing, by the interface circuit, the output signal to the local processing apparatus through the wired communication protocol.

BRIEF DESCRIPTION OF THE DRAWINGS

The teachings of the embodiments disclosed herein can be readily understood by considering the following detailed description in conjunction with the accompanying drawings.

DETAILED DESCRIPTION

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The Figures (FIG.) and the following description relate to the preferred embodiments by way of illustration only. It should be noted that from the following discussion, alternative embodiments of the structures and methods disclosed herein will be readily recognized as viable alternatives that may be employed without departing from the principles of the present invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and methods illustrated herein may be employed without departing from the principles described herein.

System Overview

Embodiments herein are primarily described in the context of a tunneling system that can be plugged into an arbitrary node in a connected topology, comprising hosts, devices, and hubs. In some embodiments, the tunneling system may operate in the context of a USB 3.0 system. However, the embodiments herein may also be used to communicate using other communication protocols such as different versions of the USB standard or entirely different protocols such as HDMI, DisplayPort, or other serial communication protocols.

Figure 1:
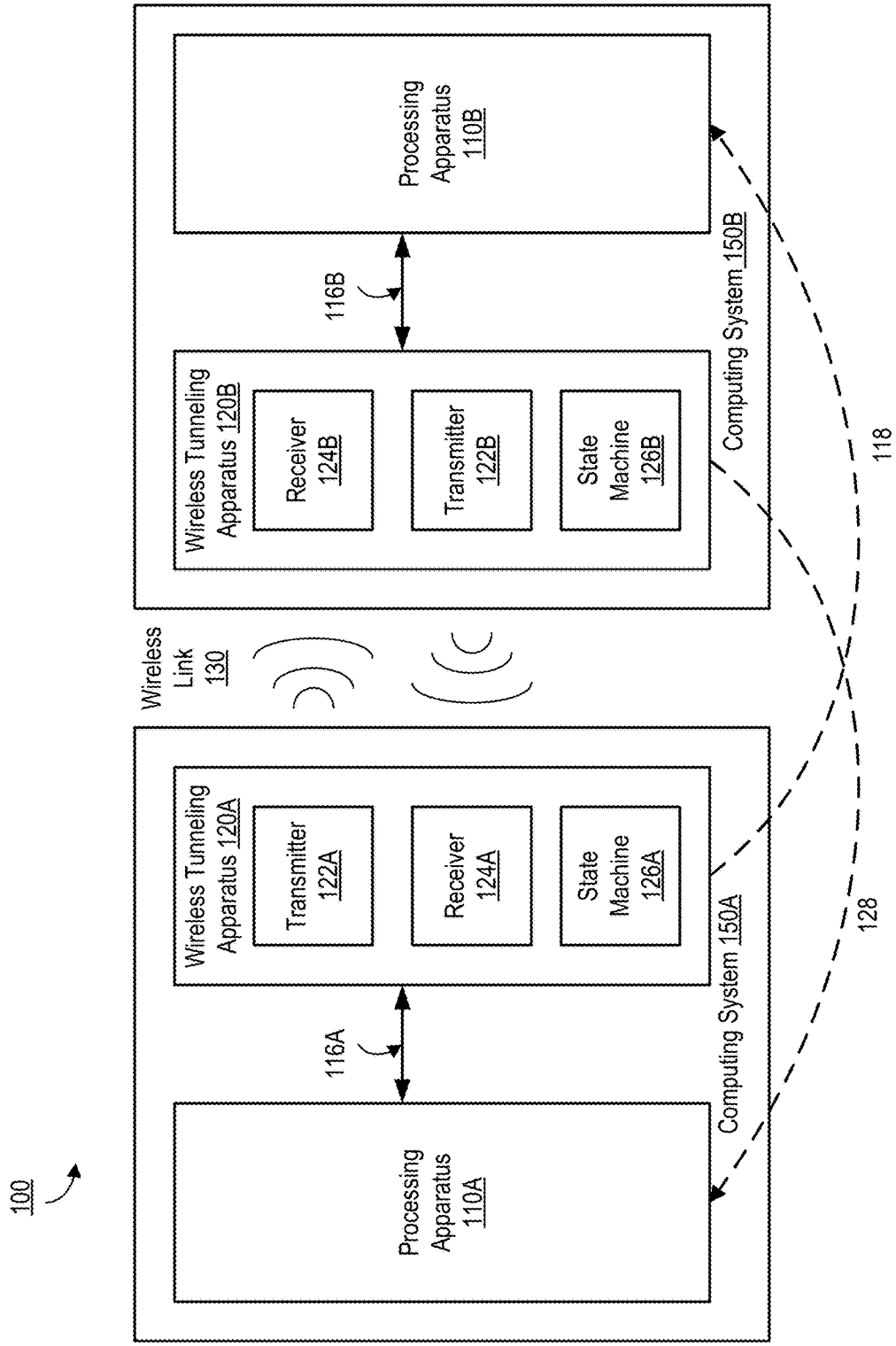
FIG. 1 illustrates one embodiment of a wireless tunneling system.

FIG. 1 illustrates an embodiment of a wireless tunneling system 100. The wireless tunneling system 100 comprises a first computing system 150A communicating with a second computing system 150B via a wireless link 130.

In one embodiment, the wireless link 130 comprises a 60 GHz wireless link. The wireless link 130 may be limited to short range communications where the wireless tunneling apparatuses 120 are in very close proximity to each other (e.g., within a few millimeters). Data transmissions over the wireless link 130 may have a data rate of, for example, 6 Gigabits per second or higher. In other embodiments, the wireless link may be suitable for a long range communications and/or implemented for other frequency bands.

The first computing system 150A includes a processing apparatus 110A coupled to a wireless tunneling apparatus 120A through a wired connection 116A, and the second computing system 150B includes a processing apparatus 110B coupled to a wireless tunneling apparatus 120B through a wired connection 116B. The wireless tunneling apparatuses 120A and 120B (herein also referred to as "wireless tunneling apparatuses 120" or "transceivers 120") communicate with each other through the wireless link 130, and tunnel communications between the processing apparatuses 110A and 110B (herein also referred to as "processing apparatuses 110" or "source apparatuses 110"). A processing apparatus can include an electronic apparatus able to exchange data (unidirectional or bidirectional) compliant with a wired communication protocol with another electronic apparatus. Examples of a processing apparatus include a source device, a sink device, an intermediate device between the source device and the sink device, USB host/device, a storage device, etc. In one embodiment, the wireless tunneling apparatus 120 is embodied as a removable dongle that can couple to a port or cable of the processing apparatus 110 (e.g., a USB port or cable, a HDMI port or cable, or a DisplayPort port or cable). In other embodiments, the wireless tunneling apparatus 120 is internally coupled to the processing apparatus 110 (e.g., via traces on a printed circuit board) or may be fully integrated with the processing apparatus 110 (e.g., in an integrated circuit).

The computing system 150 (and the components thereof) may be implemented using analog circuit components, digital logic, software, or a combination thereof. In one embodiment, one or more components of the computing system 150 may be implemented as a processor and a non-transitory computer-readable storage medium storing instructions that when executed by the processor cause the processor to carry out the functions attributed to the components. Alternatively, or in addition, digital components may be implemented as an application specific integrated circuit (ASIC), field-programmable gate array (FGPA), or using a combination of implementations.

In one embodiment, the wireless tunneling system 100 provides a replacement for conventional wired communications such as USB, HDMI, DisplayPort, or other serial communication protocols. For example, rather than the processing apparatuses 110A, 110B communicating directly to each other via a traditional cable, the processing apparatuses 110A, 110B instead communicate with their respective wireless tunneling apparatuses 120A, 120B, which then tunnel the data over a high-speed point-to-point serial wireless link 130 at speeds exceeding those that can be achieved using traditional wired communications.

From the perspective of the processing apparatuses 110A, 110B, the communications may be implemented in the same way as if the processing apparatuses 110A, 110B were directly connected in a conventional configuration. Thus, no modification to a conventional processing apparatus 110A, 110B is necessarily required (e.g., no software modification is necessary). In other words, the wireless tunneling apparatuses 120A, 120B and the wireless link 130 between them may operate as a direct replacement for a conventional cable. For example, each wireless tunneling apparatus 120A, 120B includes an interface that enables it to plug directly into a conventional cable interface of its respective processing apparatus 110A, 110B and the wireless tunneling apparatuses 120A, 120B facilitate communication such that it appears to the processing apparatuses 110A, 110B that they are directly connected. In alternative embodiments, the wireless tunneling apparatuses 120A, 120B may be integrated with their' respective processing apparatuses 110A, 110B.

Taking USB as an example, traditional wireless apparatuses with USB interfaces terminate the USB protocol in the wireless apparatus and re-encode data into a different wireless protocol for transmission. The traditional wireless apparatuses are visible as nodes (USB hubs, USB devices or USB repeaters) in the USB tree topology. In contrast, a wireless tunneling apparatus allows for USB link-layer data traffic to be transmitted without modifications at very low latency and without terminating the USB protocol layers. Such wireless tunneling apparatuses are not visible in the USB topology.

In one embodiment, each wireless tunneling apparatus 120 communicates with its connected processing apparatus 110 to mirror the states and operations of a counterpart of the processing apparatus 110 to which the wireless tunneling apparatus 120 is coupled. Thus, for example, the wireless tunneling apparatus 120A mirrors the states of the processing apparatus 110B as indicated by an arrow 118, and the wireless tunneling apparatus 120B mirrors the processing apparatus 110A as indicated by an arrow 128. Accordingly, the data communicated from the wireless tunneling apparatus 120A to the processing apparatus 110A mirror communications from the processing apparatus 110B to the wireless tunneling apparatus 120B, and data communicated from the wireless tunneling apparatus 120B to the processing apparatus 110B mirror communications from the processing apparatus 110A to the wireless tunneling apparatus 120A.

Specifically, each of the wireless tunneling apparatuses 120 predicts an operating state (e.g., a power state or other operational state) of its remote (i.e., counter-part) processing apparatus 110, and interfaces with its local processing apparatus 110A according to the predicted state through a wired connection 116. For example, the processing apparatus 110B operates in one of multiple processing states according to a wired communication protocol (e.g., USB) depending on a speed of data or power management state. The wireless tunneling apparatus 120A predicts the operating state of the processing apparatus 110B, and mirrors the predicted state of the processing apparatus 110B to interface with the processing apparatus 110A through the wired connection 116A. The mirrored state may be identical or substantially similar to the operating state of the processing apparatus 110B. In one aspect, a set of processing states of the processing apparatus 110 can be mapped or collapsed into a single state or a fewer number of states of the wireless tunneling apparatus 120, as described in further details with respect to Table 4.

The wireless tunneling apparatus 120 comprises a transmitter 122, a receiver 124, and a state machine 126. The transmitter 122 receives data from the processing apparatus 110 and transmits the data over the wireless link 130 to a receiver 124 of a different computing system 150. The receiver 124 receives data over the wireless link 130 from a transmitter 122 of another computing system 150 and provides the received data to the processing apparatus 110. The state machine 126 controls the power state of the wireless tunneling apparatus 120 by switching the wireless tunneling apparatus 120 between a high power state for transmitting high frequency data and one or more low power states as will be described in further detail below. The wireless tunneling apparatuses 120 furthermore mimic low-power states signaled within the tunneled protocol. In an embodiment, the wireless tunneling apparatus 120 is capable of full-duplex communication so that it may transmit and receive data over the wireless link 130 simultaneously.

For example, in the illustrated embodiment, the processing apparatus 110A is configured as an upstream apparatus and operates according to the state machine 126A as a "host," where the processing apparatus 110B is configured as a downstream apparatus and operates according to the state machine 126B as a "device." The processing apparatus 110A functioning as the "host" controls operations of or communication with the processing apparatus 110B functioning as the "device." The upstream wireless tunneling apparatus 120A interfaces the upstream processing apparatus 110A (or "host") through the wired connection 116A, and similarly the downstream wireless tunneling apparatus 120B interfaces the downstream processing apparatus 110B ("device") through the wired connection 116B. The wireless tunneling apparatuses 120A and 120B exchange data including status, states, or control information of respective processing apparatuses 110 over the wireless link 130.

In one embodiment, the wireless tunneling apparatuses 120A, 120B are substantially identical apparatuses. Alternatively, the wireless tunneling apparatuses 120A, 120B are different complementary apparatus types that have similar high level architectures, but differ in certain architectural or operational characteristics as described herein. For example, in one embodiment, the first wireless tunneling apparatus 120A comprises a first apparatus type configured to operate with a processing apparatus 110A embodied as a docking station, while the second wireless tunneling apparatus 120B comprises a second apparatus type configured to operate with a processing apparatus 110B embodied as a mobile apparatus. In one embodiment, in order to implement full-duplex communication, complementary wireless tunneling apparatuses 120 of different types have different antenna polarization so that two different transmitter/receiver antenna pairs can simultaneously operate in both directions. For example, the wireless tunneling apparatus 120A may have a type X transmit antenna and a type Y receive antenna, while the wireless tunneling apparatus 120B has a complementary type Y transmit antenna and a type X receive antenna. Furthermore, wireless tunneling apparatuses 120 of different types may operate according to different control schemes in order to optimize the power efficiency of one of the wireless tunneling apparatuses 120 in the pair. For example, when the first wireless tunneling apparatus 120A is configured for operating with a docking station and the second wireless tunneling apparatus 120B is configured for operating with a mobile apparatus, the wireless tunneling apparatuses 120A, 120B may operate asymmetrically in order to lower the power consumption of the wireless tunneling apparatus 120A hosted by the mobile apparatus at the expense of the wireless tunneling apparatus 120B hosted by the docking station. This tradeoff may be desirable because a docking station is typically connected to a continuous power source, while a mobile apparatus depends on a battery with limited power.

In one embodiment, the apparatus type associated with a wireless tunneling apparatus 120 (and the operation associated therewith) may be permanently designed into the wireless tunneling apparatus 120. Alternatively, a wireless tunneling apparatus 120 may be configurable between two or more apparatus types based on a switch, a control pin (i.e., control input of a chip) or register setting. Architectural and/or operational differences between the different configurations of the wireless tunneling apparatuses 120A, 120B in a complementary pair are described in further detail below.

Figure 2:
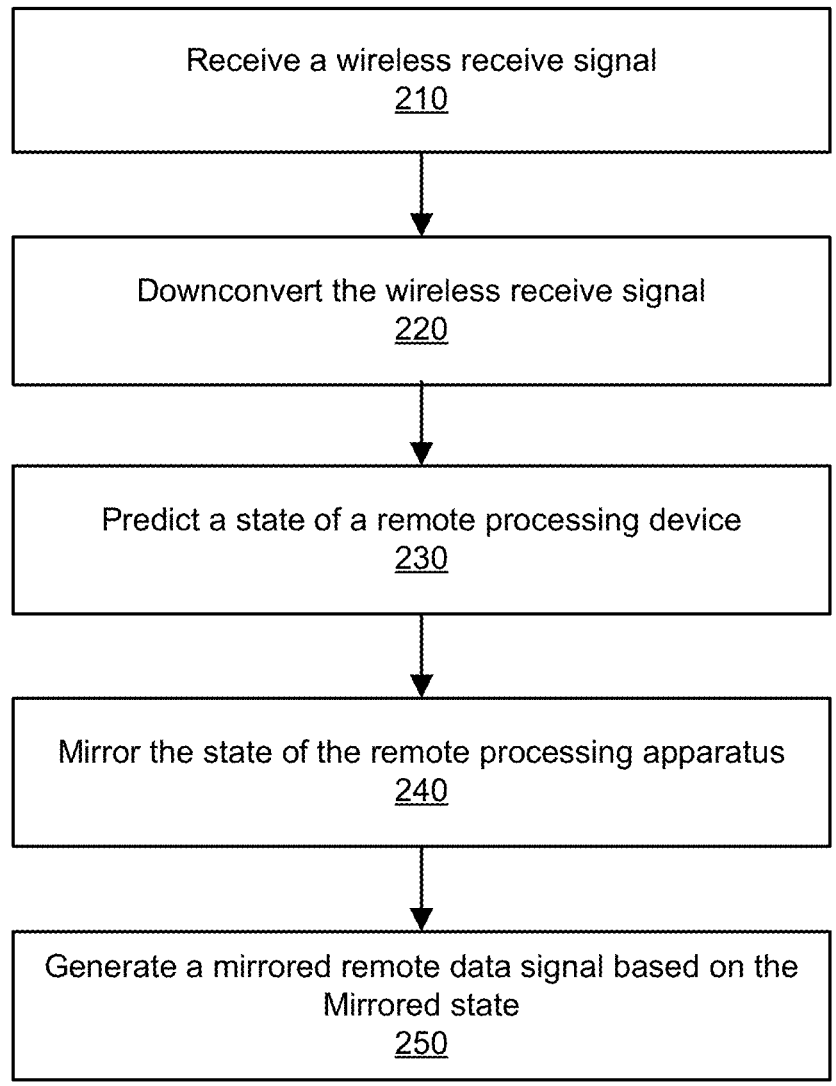
FIG. 2 illustrates an example process of a local wireless tunneling apparatus tunneling communication received from a remote processing apparatus to a local processing apparatus, according to one embodiment.

FIG. 2 illustrates an example process of a local wireless tunneling apparatus 120A tunneling communication from a remote processing apparatus 110B to a local processing apparatus 110A, according to one embodiment.

The local wireless tunneling apparatus 120A receives 210 a wireless receive signal from the remote wireless tunneling apparatus 120B through the wireless link 130. The wireless receive signal is received at a first frequency (e.g., ~60 GHz). The wireless receive signal is generated by the wireless tunneling apparatus 120B according to a remote data signal from the remote processing apparatus 110B. The remote data signal contains content information to be transmitted to the local processing apparatus 110A, and conforms to a wired communication protocol (e.g., USB protocol).

Responsive to receiving the wireless receive signal, the local wireless tunneling apparatus obtains a baseband signal based on the wireless receive signal. Specifically, the local wireless tunneling apparatus 120A downconverts 220 the wireless receive signal to a second frequency (e.g., a few Gbps) lower than the first frequency. The downconverted wireless receive signal is a baseband signal.

In one aspect, the local wireless tunneling apparatus 120A predicts 230 a state of the remote processing apparatus 110B based on the baseband signal. The baseband signal may be encoded with a state signal indicative of a prior state of the remote processing apparatus 110B. The local wireless tunneling apparatus 120A can decode the baseband signal to obtain the state signal of the remote processing apparatus 110B, and predict a state of the remote processing apparatus 110B based on the prior state of the remote processing apparatus 110B. In another aspect, the local wireless tunneling apparatus 120A predicts the remote processing state of the remote processing apparatus based on a portion of the baseband signal corresponding to the wireless receive signal. For example, in the context of USB, the local wireless tunneling apparatus 120A may predict the remote processing state by analyzing the received USB data packets. Yet in another aspect, the local wireless tunneling apparatus 120A predicts the remote processing state of the remote processing apparatus based on local event (e.g., current or one or more prior local processing states of the local processing apparatus such as timeout events).

The local wireless tunneling apparatus 120A mirrors 240 the state of the remote processing apparatus 110B. Specifically, the local wireless tunneling apparatus 120A interfacing the local processing apparatus 110A mirrors the predicted state of the remote processing apparatus 110B, and generates 250 a mirrored remote data signal based on the mirrored state and the baseband signal. The mirrored remote data signal is identical or substantially similar to the remote data signal generated at the remote processing apparatus 110B. For example, the local wireless tunneling apparatus 120A provides the mirrored remote data signal to the local processing apparatus 110A according to the predicted state. Accordingly, tunneling of communication from the remote processing apparatus 110B to the local processing apparatus 110A can be achieved.

Figure 3:
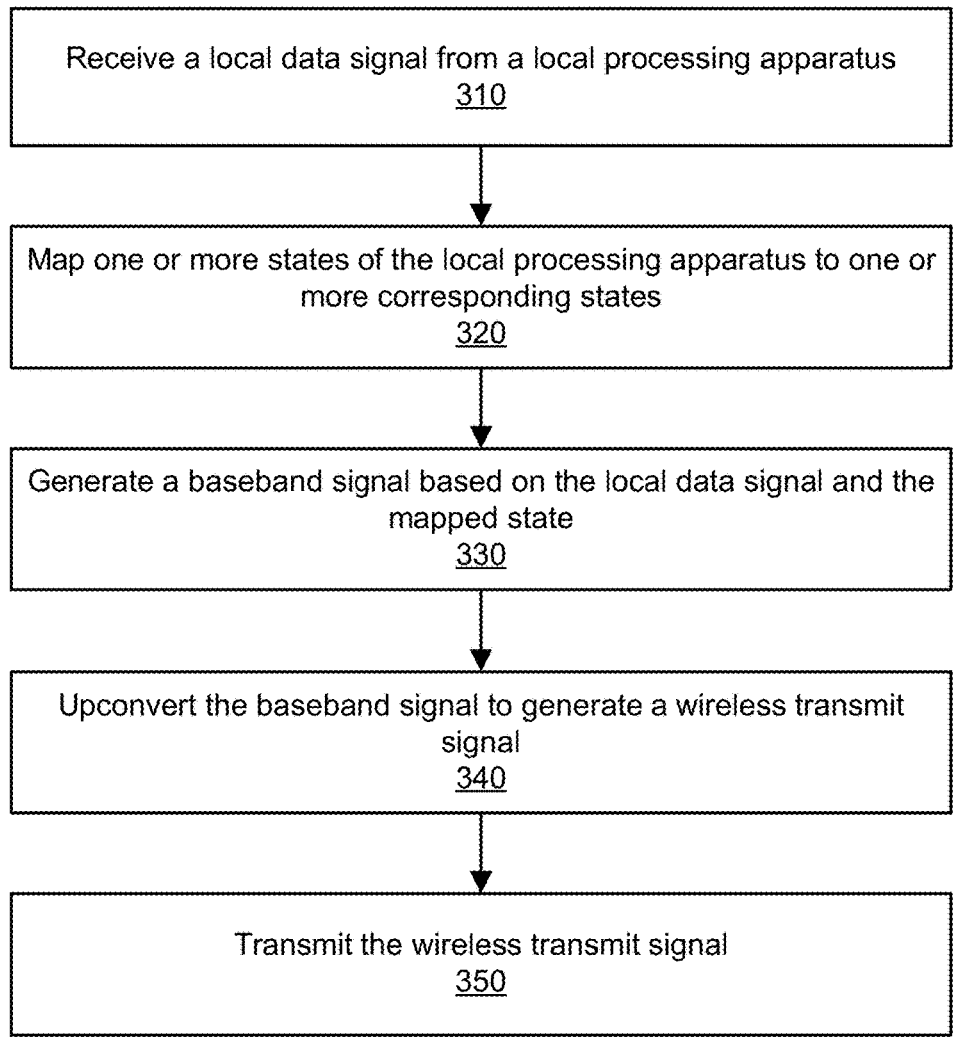
FIG. 3 illustrates an example process of a local wireless tunneling apparatus tunneling communication received from a local processing apparatus to a remote processing apparatus, according to one embodiment.

FIG. 3 illustrates an example process of a local wireless tunneling apparatus 120A tunneling communication from the local processing apparatus 110A to the remote processing apparatus 110B, according to one embodiment.

The local wireless tunneling apparatus 120A receives 310 a local data signal from the local processing apparatus 110A. The local data signal contains information to be transmitted to the remote processing apparatus 110B, and conforms to a wired communication protocol (e.g., USB protocol).

In one aspect, the local wireless tunneling apparatus 120A obtains one or more states of the local processing apparatus 110A, and maps 320 the one or more states of the local processing apparatus 110A to one or more corresponding states. The local wireless tunneling apparatus 120A receives a signal indicating a current operating state of the local processing apparatus 110A from the local processing apparatus 110A. Alternatively, the local wireless tunneling apparatus 120A determines the operating state of the local processing apparatus 110A, according to the local data signal received (e.g., values thereof) and/or prior operating states of the local processing apparatus 110A.

The local wireless tunneling apparatus 120A generates 330 a baseband signal at the second frequency (e.g., a few Gbps) based on the local data signal and the mapped state. In one aspect, the local wireless tunneling apparatus 120A encodes the baseband signal according to the mapped state. For example, the local wireless tunneling apparatus 120A encodes the baseband signal with a state signal indicating a mapped state of the local wireless tunneling apparatus 120A.

The local wireless tunneling apparatus 120A upconverts 340 the baseband signal at the second frequency (e.g., a few Gbps) to generate a wireless transmit signal at the first frequency (e.g., 60 GHz), then transmits 350 the wireless transmit signal to the remote wireless tunneling apparatus 120B through the wireless link 130.

Advantageously, the wireless tunneling apparatus 120 predicts an operating state of a remote processing apparatus 110, and mirrors the operation of the remote processing apparatus 110. Hence, any delays for converting data in a wired communication protocol to another protocol (e.g., wireless communication protocol) or transitioning between different states of the wireless tunneling apparatus may be reduced. Thus, seamless tunneling of communication between the two processing apparatuses 110A, 110B with a high speed data rate (e.g., multi-Gbps) through the wireless link 130 can be achieved.

Detailed Wireless Tunneling Apparatus Architecture

Figure 4:
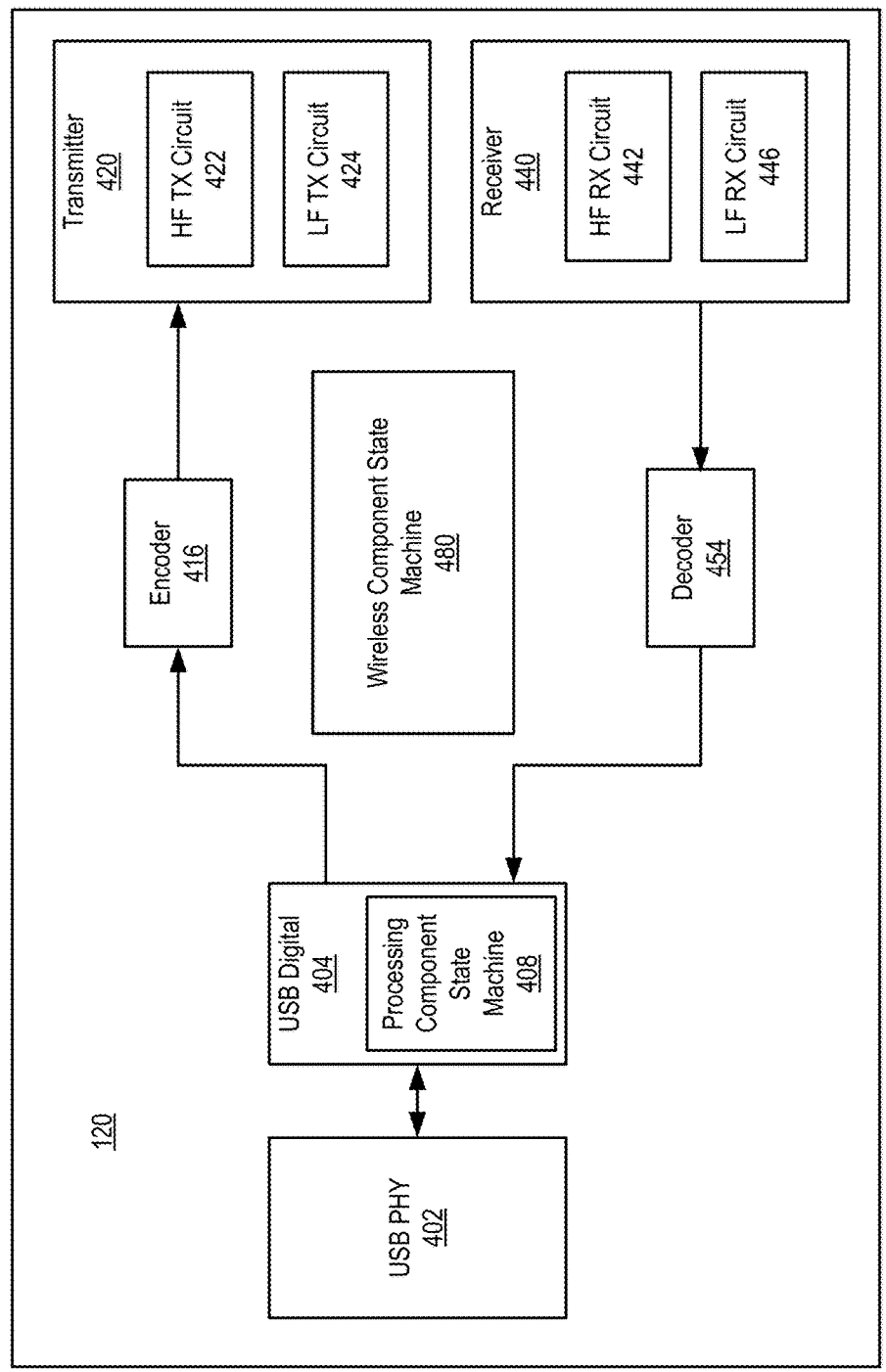
FIG. 4 illustrates a detailed architecture of a wireless tunneling apparatus, according to one embodiment.

FIG. 4 shows a detailed architecture of a wireless tunneling apparatus 120, according to one embodiment. While the diagram in FIG. 4 may correspond to the wireless tunneling apparatuses 120 illustrated in FIG. 1, it illustrates an example in further detail in order to better explain operation of the apparatuses 120 in accordance with one embodiment. In one embodiment, the wireless tunneling apparatus 120 includes a full-duplex high speed data-path capable of tunneling at USB 3.0 speeds. In one implementation, the wireless tunneling apparatus 120 includes a USB PHY 402, USB digital 404, an encoder 416, a transmitter 420, a wireless component state machine 480, a decoder 454, and a receiver 440. Additional components may be implemented for a proper communication conforming to USB protocol. Together, these components operate to tunnel communications between two processing apparatuses 110.

The USB PHY 402 is a mixed-signal interface circuit that is in one embodiment fully compliant with USB 3.0 electrical specification and supports all four different USB speeds: super-speed (5 Gbps), high-speed (480 Mbps), full-speed (12 Mbps), and low-speed (1.5 Mbps). It supports the full range of USB 3.0 host and peripheral applications. The USB PHY 402 provides digital interfaces compliant with PIPE3.0 (for SS) and UTMI+ (for HS/FS/LS). The UTMI+ provides two interfaces for FS/LS: standard 8-bit/16-bit interface or bit-serial interface. An embodiment of the tunneling architecture described herein uses the bit-serial interface in order to minimize end-to-end latency across the two wireless tunneling apparatuses 120. The bit-serial interface saves time to serialize and de-serialize bit data, and thereby reducing latency.

The USB PHY 402 implements reduced power consumptions for all low power states defined in USB 3.0 specification: U0/U1/U2/U3 for super-speed and suspend-resume for HS/FS/LS. It also supports the transmission and reception of Low Frequency Periodic Signaling (LFPS), as defined in the specification, for exiting from low power states.

The USB digital 404 is a circuit component that interfaces between the USB PHY 402 and wireless components (e.g., transmitter 420 and receiver 440). The USB digital 404 determines operating states of the USB PHY 402 and the wireless components. The USB digital 404 is functional both when tunneling communication from the local processing apparatus 110A to the remote processing apparatus 110B, and when tunneling communication from the remote processing apparatus 110B to the local processing apparatus 110A.

For tunneling communication from the local processing apparatus 110A to the remote processing apparatus 110B, the USB digital 404 receives a local data signal from the local processing apparatus 110A through the USB PHY 402, and provides the local data signal to the encoder 416. In one aspect, the USB digital 404 generates a state signal of the local processing apparatus 110A indicating a local processing state of the local processing apparatus 110A. The state signal of the local processing apparatus 110A enables a USB digital 404 of a counterpart wireless tunneling apparatus 120B to predict an operating state of the local processing apparatus 110A. The USB digital 404 can identify a state of the local processing apparatus 110A based on the local data signal. Furthermore, the USB digital 404 generates the state signal according to the mapped state, and provides the local data signal and the state signal of the local processing apparatus 110A to the encoder 416.

The encoder 416 encodes the local data signal with the state signal of the local processing apparatus 110A, and provides the encoded signal to the transmitter 420. In one aspect, the local data signal may be scrambled to remove undesirable properties such as non-zero DC bias (number of 0's and 1's are not same) before or after encoding by the encoder or a scrambler (not shown for simplicity). USB super-speed data over a USB cable has a raw speed of 5 Gbps, out of which 20% is contributed by 8b/10b coding. This is prescribed in the USB standard to protect against cable related bit errors. This overhead is removed for wireless transmission and super-speed data bandwidth is reduced to 4 Gbps. Instead error correction codes are added for wireless transmission, so that wireless related bit errors can be detected and corrected. According to the encoding, the receiver side could possibly correct bit errors introduced by wireless transmission. The FEC used in one implementation is a (232, 216) Bose-Chaudhuri-Hocquenghem code (BCH code), which is a cyclic error-correcting code in which each output code-word has 232 bits for a given 216-bit sequence. BCH code beneficially has error correction capability and low encoding and decoding latency. The code may be systematic, which implies that the first 216 bit output is just copied from the input sequence. The last 16 bits can be encoded using a BCH code generator matrix.

The transmitter 420 receives the encoded signal from the encoder 416, upconverts the encoded signal and transmits the upconverted signal wirelessly. In one aspect, the transmitter 420 includes a high frequency transmitting circuit 422 and a low frequency transmitting circuit 424. The high frequency transmitting circuit 422 is used for upconverting a high data rate (e.g., 6 Gbps) digital baseband signal to an RF frequency (e.g., 60 GHz) and transmitting the upconverted signal. For example, the high frequency transmitting circuit 422 is suitable for upconverting a high data rate signal conforming to USB protocol, an HDMI protocol, a DisplayPort protocol, or other communication protocol, and transmitting the upconverted signal through the wireless link 130. The low frequency transmitting circuit 424 is used for upconverting a low data rate (e.g., ~100 kbps) digital baseband signal to an RF frequency (e.g., 60 GHz) and transmitting the upconverted signal. For example, the low frequency transmitting circuit 424 is suitable for upconverting a low data rate signal including control information for operating in or transitioning between different states of the wireless component state machine 480, or power state of wireless components. While the high frequency transmitting circuit 422 is capable of transmitting a higher data rate signal than the low frequency transmitting circuit 424, the high frequency transmitting circuit 422 may include more circuit components than the low frequency transmitting circuit 424, and may consume more power than the low frequency transmitting circuit. In one aspect, one of the high frequency transmitting circuit 422 and the low frequency transmitting circuit 424 is selected according to the wireless component state machine 480, for transmission of a suitable data rate signal.

For tunneling communication from the remote processing apparatus 110B to the local processing apparatus 110A, the receiver 440 receives a wireless receive signal from a transmitter of another wireless tunneling apparatus 120, and downconverts the wireless receive signal to obtain a baseband signal. In one aspect, the receiver 440 includes a high frequency receiving circuit 442 and a low frequency receiving circuit 446. The high frequency receiving circuit 442 is used for downconverting an RF frequency (e.g., 60 GHz) to a high data rate (e.g., 6 Gbps) digital baseband signal. The low frequency receiving circuit 446 is used for downconverting an RF frequency (e.g., 60 GHz) to a low data rate (e.g., ~100 kbps) digital baseband signal. While the high frequency receiving circuit 442 is capable of downconverting a signal with data rate higher than the low frequency receiving circuit 446, the high frequency receiving circuit 442 may include more circuit components than the low frequency receiving circuit 446, and may consume more power than the low frequency receiving circuit 446. In one aspect, one of the high frequency receiving circuit 442 and the low frequency receiving circuit 446 is selected according to the wireless component state machine 480 for receiving a suitable data rate signal.

The decoder 454 receives the downconverted signal from the receiver 440, and decodes the recovered signal. In one approach, the downconverted signal may be descrambled before or after decoding by the decoder 454 (the descrambler is not shown for simplicity). The decoder 454 can decode the downconverted signal to obtain a remote data signal and a state signal of the remote processing apparatus 110B indicating a prior state of the remote processing apparatus 110B. In one embodiment, a hard-decision based BCH decoder is implemented. The decoder 454 may detect and correct any bit error in the downconverted signal. The (232, 216) BCH code can correct up to two bit errors in a 232-bit code-word. This coding scheme improves bit errors that are independent and random. The decoder 454 provides the remote data signal and the state signal of the remote processing apparatus 110B to the USB digital 404.

Referring back to the USB digital 404, the USB digital 404 receives a remote data signal and a state signal of the remote processing apparatus 110B from the decoder 454. The USB digital 404 can predict the operating state of the remote processing apparatus 110B, based on the state signal of the remote processing apparatus 110B. Based on the state signal of the remote processing apparatus 110B, the USB digital predicts an operating state of the remote processing apparatus 110B, for example, by considering the communication delay between the remote processing apparatus 110B and the local processing apparatus 110A, prior operating states of the remote processing apparatus 110B or the local processing apparatus 110A, remote data signal or a combination of both. The USB digital 404 configures the USB PHY 402 according to the predicted state of the remote processing apparatus 110B, and provides the remote data signal to the local processing apparatus 110A through the USB PHY 402 in a manner that any delay of the wireless tunneling apparatuses 120A and 120B can be eschewed.

In one embodiment, the USB digital 404 includes a processing component state machine 408 for mirroring an operating state of the remote processing apparatus 110B. The processing component state machine 408 can comprise an adapted implementation of Link Training and System Status Machine (LTSSM) from USB 3.0 specification. The Link Training and Status State Machine (LTSSM) in USB 3.0 specification is a state machine defined for link connectivity and link power management. Additionally, the processing component state machine 408 may include a Reset Protocol State Machine (RPSM) from USB 2.0 specification. The processing component state-machine 408 is designed to track the LTSSM state or RPSM state of the USB host/device/hub on the opposite side of the wireless link, as shown in FIG. 1. The processing component state machine 408 predicts an operating state of the remote processing apparatus 110B, and mirrors the state of the remote processing apparatus 110A.

In one aspect, the processing component state machine 408 maps one or more states of itself to one or more corresponding states of the wireless component state machine 480, and configures the state of the wireless component state machine 480. The wireless component state machine 480 controls the power state of the wireless components of the transmitter 420 and the receiver 440 in order to improve power efficiency of the wireless components. For example, because the power consumption of the high frequency transmitting circuit 422 is relatively high compared to the low frequency transmitting circuit 424, the wireless component state machine 480 can control the high frequency transmitting circuit 422 to operate in a low power state or turn off the high frequency transmitting circuit 422 during a low frequency transmission when the high frequency transmitting circuit 422 is not being used. During high frequency transmissions, the low frequency transmitting circuit 424 may be powered down. Similarly, because the power consumption of the high frequency receiving circuit 442 is relatively high compared to the low frequency receiving circuit 446, the wireless component state machine 480 can control the high frequency receiving circuit 442 to operate in a low power state or turn off the high frequency receiving circuit 442 during a low frequency reception when the high frequency receiving circuit 442 is not being used. During high frequency reception, low frequency receiving circuit 446 may be powered down.

Additionally, the wireless component state-machine 480 controls numerous system functions including, for example:
(1) detect detachment and attachment of USB host/device
(2) control power state of wireless blocks & USB PHY based on USB power state
(3) ensure synchronicity of USB host and device by reproducing the link response across the wireless link.

Figure 5:
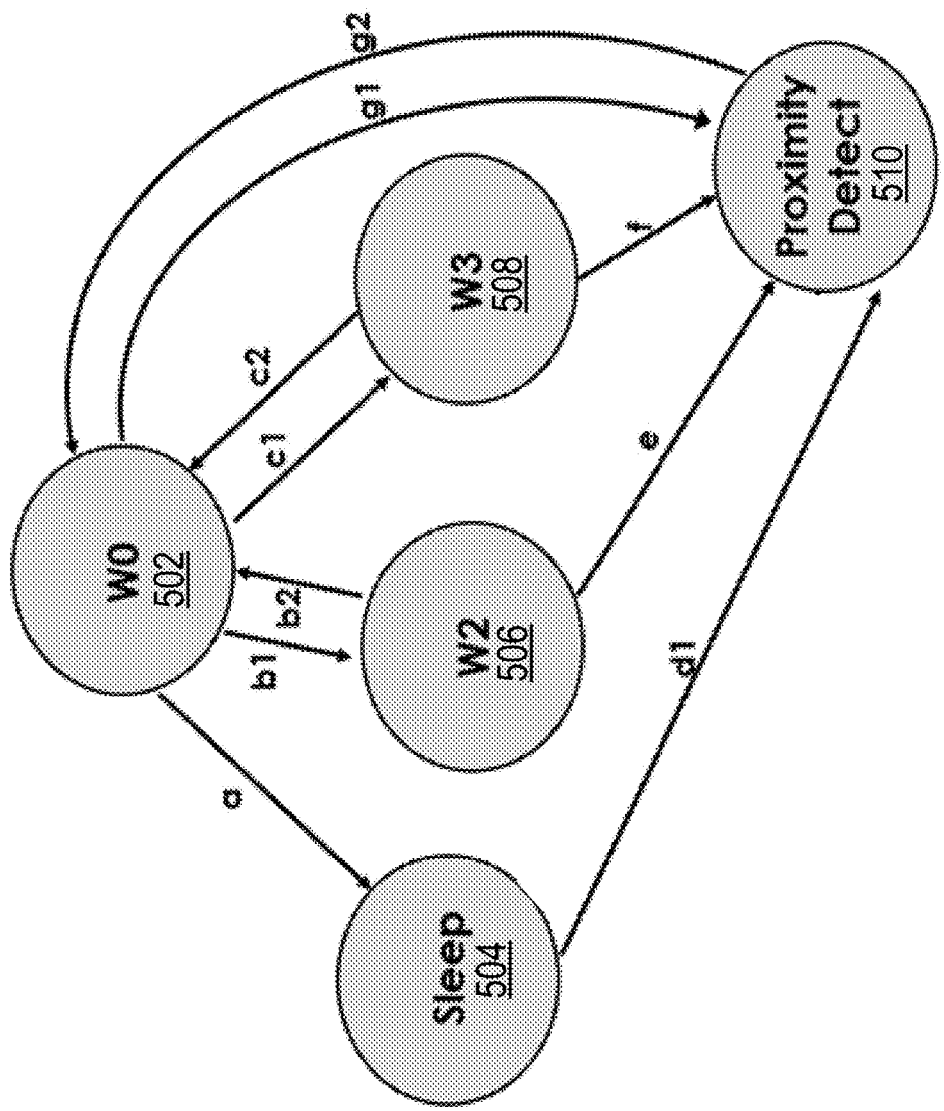
FIG. 5 illustrates an example state transition diagram of a wireless tunneling apparatus, according to one embodiment.

FIG. 5 illustrates an example state transition diagram for a wireless tunneling system capable of tunneling USB data, according to one embodiment. Each state of the wireless component state machine 480 may be mapped to a corresponding state of the processing component state machine 408 as shown in Table 2 below. In this embodiment, five possible power states are available: a W0 state 502, a W2 state 506, a W3 state 508, a proximity detect state 510, and a sleep state 504. In one aspect, the wireless component state machine 480 operates in one of the power states shown in FIG. 5.

The W0 state 502 represents the high power state in which the high frequency transmitting circuit 422, high frequency receiving circuit 442, and associated components are enabled, and the wireless tunneling apparatus 120 is actively transmitting, or is available and ready to transmit, high frequency serial data (e.g., USB data). In the W0 state, the high frequency transmitting circuit 422 and the high frequency receiving circuit 442 are turned on and the wireless tunneling apparatus 120 may actively tunnel USB data. If proximity to the other apparatus is lost, the wireless tunneling apparatus 120 transitions to the proximity detect state. In the proximity detect state 510, the high frequency transmitting circuit 422 and high frequency receiving circuit 442 are turned off. The low frequency transmitting circuit 424 and low frequency receiving circuit 446 are turned on to periodically check for proximity to another apparatus and are turned off when not being used. A wireless tunneling apparatuses 120A and 120B may enter the sleep state 504 from the W0 state if proximity detection is successful but the processing apparatus 110 is determined to be not attached. This determination is made in the W0 state 502. In the sleep state 504, only "always-on" blocks are running and other components are turned off for power efficiency. The wireless tunneling apparatus remains in the sleep state 504 for a pre-defined time, and then goes back to the proximity detect state 510 to make sure that wireless proximity is maintained. If a nearby apparatus is detected, the wireless tunneling apparatus 120 transitions back to the W0 state 502 in which attachment of the processing apparatus is checked. The W2 and W3 states 506, 508 are entered when a wireless tunneling apparatus pair 120A/120B is in wireless proximity, the processing apparatuses 110A/110B are in attached state, but the processing apparatuses 110 are in a low power state or are not actively communicating data. For example, the W2 state 506 is entered when the processing apparatus 110 is in a "U2" low-power state of USB 3.0 Superspeed, and the W3 state 508 is entered when the processing apparatus 110 is either in "U3" state of USB 3.0 Superspeed or in "Suspend" state of USB 2.0 Highspeed.

Each arc in FIG. 5 represents a possible transition between states. The conditions for transitioning between the states are summarized in the Table 1 and described in more detail below.

TABLE 1

State Transition for Wireless Tunneling Apparatus

| ARC | Local apparatus requirements | Remote apparatus requirements |
|---|---|---|
| A | USB 2.0 disconnected and USB 3.0 disabled | proposed_link_state == SLEEP |
| b1 | USB 2.0 disconnected or suspended and USB 3.0 in U2 state. | proposed_link_state == W2 |
| b2 | USB 2.0/USB 3.0 wakeup event locally or remotely | n/a |
| c1 | USB 2.0 disconnected or suspended and USB 3.0 in U3 state | proposed_link_state == W3 |
| c2 | USB 2.0/USB 3.0 wakeup event locally or remotely | n/a |
| d1 | Sleep timer times out | n/a |
| E | Wireless keep-alive signal not seen for N seconds | n/a |
| F | Wireless keep alive signal not seen for N seconds | n/a |
| g2 | Into W0: Proximity is detected | n/a |
| g1 | HF wireless Link is lost by HF synchronization state machine. | n/a |

Transitions out of the W0 state 502 (e.g., via arcs a, b1, c1, and g1) depend both on the state of the local wireless tunneling apparatus as well as the state of the remote wireless tunneling apparatus in proximity to the local wireless tunneling apparatus. In order to communicate the state of the local apparatus to the remote apparatus, and vice versa, a signal proposed_link_state is periodically transmitted between the apparatuses when in the W0 state 502 indicating the transition to a new state dictated by the local apparatus conditions. For example, in one embodiment, the signal proposed_link_state is a 2-bit signal encoding a state advertised by the local apparatus based on its conditions (e.g., '0' represents W0, '1' represents W2, '2' represents W3, and '3' represents Sleep). The signal proposed_link_state is periodically updated and exchanged over the wireless link when in the W0 state 502.

An apparatus advertises a transition to the sleep state 504 (arc a) when it detects that the processing apparatus 110 is disabled or disconnected. The apparatus advertises a transition to the W2 state 506 (arc b1) when it detects that USB 2.0 has disconnected or suspended and USB 3.0 has gone into U2 low-power state. The apparatus advertises a transition to the W3 state 508 (arc c1) when it detects that USB 2.0 has disconnected or suspended and USB 3.0 has gone into U3 state. The apparatus advertises a transition to the proximity detect state 510 when the HF wireless link (i.e., a wireless link 130 using high frequency transmit and receive data paths) is lost.

The state change out of W0 occurs only after both sides of the wireless link 130 advertise the same low power state (e.g., SLEEP, W2, or W3). Otherwise, both apparatuses remain in the W0 state 502. In the W0 state 502 the value of proposed_link_state is transmitted periodically. After both local and remote apparatuses advertise the same low power state, the apparatuses transition to that state.

Exiting from the W2 state 506 to the W0 state 502 (arc b2) is triggered by an upstream or downstream processing apparatus sending an exit event. For example, in USB 3.0, the exit event may comprise a U2 exit LFPS (Low Frequency Periodic Signaling) to a wireless tunneling apparatus 120. In order for the W2 exit to occur, the wireless tunneling apparatus 120 transmits back a handshake LFPS with low enough latency to meet the requirements of the underlying serial protocol (e.g., 2 ms for USB 3.0 links). In one implementation, the fast W2 exit is facilitated by keeping all phase-locked loops (PLLs) powered when operating in the W2 state 506.

In one example, states of the processing component state machine 408 are mapped to states of the wireless component state machine 480, as shown below in Table 2.

TABLE 2

Mapping between USB3.0 LTSSM states and wireless power states

| LTSSM States (from USB3.0 Specification) | Wireless Power States |
|---|---|
| U1 | W0 |
| U2 | W2 |
| U3 | W3 |
| SS.Disabled, SS.Inactive, Rx.Detect | Loop between W0/Sleep |
| U0 and all other active states | W0 |

Wireless Tunneling Apparatus Architecture for USB3.0

Figure 6:
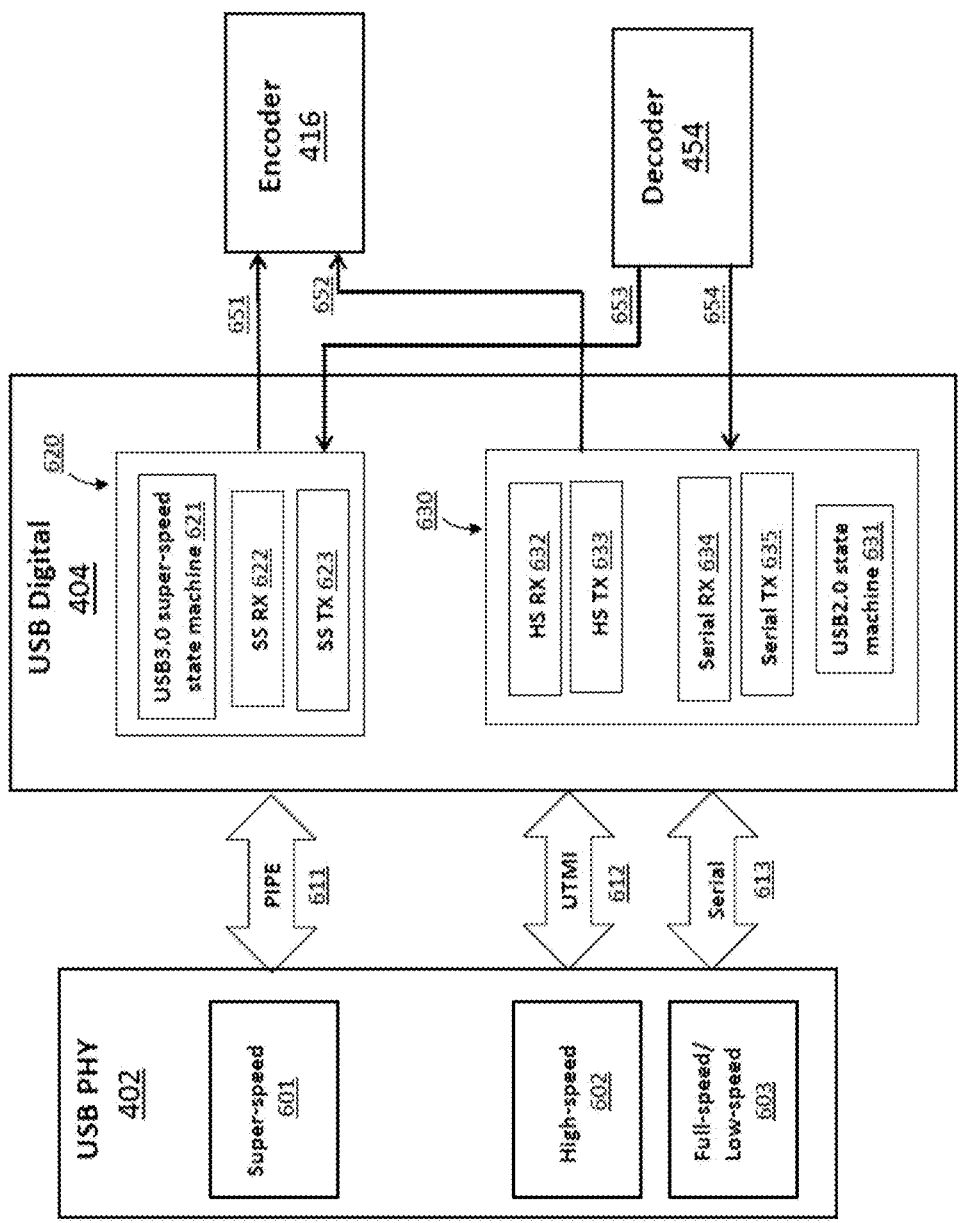
FIG. 6 illustrates a detailed architecture of the wireless tunneling apparatus conforming to the USB3.0 protocol, according to one embodiment.

FIG. 6 shows architecture of the wireless tunneling apparatus conforming to the USB3.0 protocol, according to one embodiment. The USB3.0 standard prescribes support for four different transfer speeds: super-speed (herein also referred to as "SS"), high-speed (herein also referred to as "HS"), full-speed (herein also referred to as "FS"), and low-speed (herein also referred to as "LS"). FIG. 6 shows dataflow for all four USB speeds through the USB PHY 402 and USB Digital 404.

On one side of the USB PHY 402 is the cable interface with the processing apparatus 110. On the other side of the USB PHY 402 is the digital data interface to the USB Digital 404, operating at a frequency lower than that of the cable interface. The USB PHY 402 provides support for all aspects of super-speed USB 601 functionality and interfaces with the USB Digital 404 via the industry standard PIPE interface 611. This bi-directional interface comprises two buses—one each for data going in and out of the USB PHY 402. The bus width in PIPE interface 611 is 16 or 32 bits. In one embodiment, the 16-bit bus width is employed to reduce latency. Likewise the high-speed data 602 from cable interface is interfaced with the USB Digital 404 using industry-standard UTMI interface. In most conventional USB PHY implementations, the full-speed and low-speed data 603 are provided both on UTMI interface 612 and serial interface 613. In one aspect, UTMI interface 612 is employed for designing digital design pipelines. However, the UTMI interface comprises 8 or 16-bit wide buses, and may suffer from large latencies due to cycles for serialization or deserialization of FS/LS data bits, thereby making it unsuitable for low-latency tunneling design. To overcome this large latency, in one embodiment the serial interface 613 is employed to interface FS/LS data 603 with USB digital 404.

The USB digital 404 comprises components for SS, HS, FS, and LS. The super-speed subsystem 620 comprises SS receive data-path block 622 and SS transmit data-path block 623, and a USB3.0 super-speed state machine 621 that controls the operation of the data-path blocks, as will be described later. Likewise the HS/FS/LS subsystem 630 comprises HS receive data-path block 632, HS transmit data-path block 633, serial receive data-path 634, serial transmit data-path block 635, and USB2.0 state machine 631. The USB2.0 state machine 631 controls operation of these data path blocks in the HS/FS/LS subsystem 630, as will be described later. In any given session, the tunneling system operates in one of HS, FS, or LS modes, depending on the detection state between the processing apparatus 110 and the wireless tunneling apparatus 120. In certain USB connection topologies, SS and one of HS/FS/LS can be active simultaneously, for example, when a pair of wireless tunneling apparatuses resides between a processing apparatus that is a USB3.0 host and a processing apparatus that is USB3.0 hub.

The USB digital 404 provides data to the encoder 416 for wireless transmission using two interfaces that are operational in parallel: one for super-speed 651, and another for HS/FS/LS 652. The encoder 416 packs the data from both these interfaces as per a fixed frame structure, and provides a single data stream to transmitter 420 for wireless transmission. Likewise, the interface of USB digital 404 with decoder 454 comprises an interface for super-speed 653 data and another, for HS/FS/LS 654 data. The decoder 454 receives a data stream from the wireless receiver 440, unpacks the data stream as per a fixed frame structure, and provides data simultaneously on both interfaces for super-speed 653 data and HS/FS/LS 654 data.

Example State Machine Implementation for USB Protocol

USB 3.0 Super-Speed State Machine

The Link Training and Status State Machine (LTSSM) in USB 3.0 specification is a state machine defined for link connectivity and link power management. The specification defines 12 states with 24 sub-states for specific functionalities, as summarized in Table 3.

TABLE 3

LTSSM states and sub-states from USB 3.0 Specification

| LTSSM Sub-states (24) | LTSSM States (12) | Functionality |
| --- | --- | --- |
| U0 | U0 | State in which SS packet transfers in progress |
| U1 | U1 | Low power state with short exit latency |
| U2 | U2 | Low power state with exit latency more than U1 |
| U3 | U3 | Low power state with most exit latency |
| SS.Inactive.Disconnect.Detect<br>SS.Inactive.Quiet | SS.Inactive | Link error state where a link is in a non-operable state and system/software intervention is necessary |
| Rx.Detect.Reset<br>Rx.Detect.Active<br>Rx.Detect.Quiet | Rx.Detect | State in which USB port is attempting to determine if SS link partner is present and upon detecting presence the link training is started |
| SS.Disabled.Default<br>SS.Disabled.Error | SS.Disabled | Superspeed connectivity is disabled and the link may operate under USB 2.0 mode |
| Compliance Mode | Compliance Mode | State to allow for transmitter compliance test |
| Loopback.Active<br>Loopback.Exit | Loopback | State to allow for bit error test |
| Recovery.Active<br>Recovery.Configuration<br>Recovery.Idle | Recovery | State for retraining link after exiting low power state, or detecting that link is not operating in U0 properly, or a link partner decides to change mode of link operation |
| Hot Reset.Active<br>Hot Reset.Exit | Hot Reset | State defined to allow a downstream port to reset its upstream port |
| Polling.LFPS<br>Polling.RxEQ<br>Polling.Active<br>Polling.Configuration<br>Polling.Idle | Polling | State defined for two link partners to have their SS transmitters and receivers trained, synchronized, and ready for packet transfer |

The 25-state USB3.0 super-speed state machine 631 inside USB digital 404 is implemented by optimizing the 24-state LTSSM and adapting for wireless tunneling according to one embodiment. It is shown in Table 4. The USB3.0 super-speed state machine 631 is derived from LTSSM by either one of: collapsing multiple sub-states into one, splitting a single sub-state into multiple states, or adding a new state. That derivation is shown in Table 4.

TABLE 4

States of USB3.0 super-speed state machine for wireless tunneling

| | USB 3.0 super speed state machine (for wireless tunneling) | LTSSM sub-states from USB3.0 specification | Comments |
| --- | --- | --- | --- |
| 1 | POWER_OFF | SS.Disabled.Default (VBUS) | LTSSM sub-state split |
| 2 | SS.Disabled.Default | SS.Disabled.Default (Clock) | LTSSM sub-state split |

TABLE 4-continued

States of USB3.0 super-speed state machine for wireless tunneling

| | USB 3.0 super speed state machine (for wireless tunneling) | LTSSM sub-states from USB3.0 specification | Comments |
|---|---|---|---|
| | | SS.Inactive.Quiet | LTSSM sub-state collapsed |
| | | SS.Inactive.Disconnect.Detect | LTSSM sub-state collapsed |
| 3 | SS.Disabled.Error | SS.Disabled.Error | |
| 4 | Rx.Detect.Reset | Rx.Detect.Reset | |
| 5 | Rx.Detect.Active | Rx.Detect.Active | |
| 6 | Rx.Detect.Quiet | Rx.Detect.Quiet | |
| 7 | Rx.Detect.Remote | | New state added |
| 8 | Polling.LFPS | Polling.LFPS | |
| 9 | Polling.RxEQ | Polling.RxEQ | |
| 10 | PollingTraining | Polling.Active<br>Polling.Config<br>Polling.Idle | 3 LTSSM sub-states collapsed |
| 11 | NonPollingTraining | Recovery.Active<br>Recovery.Configuration<br>Recovery.Idle<br>Hot Reset.Active<br>Hot Reset.Exit | 5 LTSSM sub-states collapsed |
| 12 | U0 | U0 | LTSSM sub-state split in 2 |
| 13 | U0_Exit | | |
| 14 | U1 | U1 | LTSSM sub-state split in 2 |
| 14 | U1_Exit | | |
| 16 | U2 | U2 | LTSSM sub-state split in 2 |
| 17 | U2_Exit | | |
| 18 | U3 | U3 | LTSSM sub-state split in 2 |
| 19 | U3_Exit | | |
| 20 | Compliance Mode | Compliance Mode | |
| 21 | Loopback.Active.Local | Loopback.Active | LTSSM sub-state split in 2 |
| 22 | Loopback.Active.Through | | |
| 23 | Loopback.Exit.Local | Loopback.Exit | LTSSM sub-state split in 2 |
| 24 | Loopback.Exit.Through | | |
| 25 | IdleTraining | | New state added |

The USB3.0 super-speed state machine is designed to track the LTTSM state of the USB host/device/hub on the opposite side of the wireless link, as shown in FIG. 1. The state transitions are therefore made based on one of three types of inputs:

(1) Signaling information received over wireless from USB3.0 super-speed state machine of the remote wireless tunneling apparatus (e.g., remote.RX_SIG_POWEROFF from Table 7), (2) USB packet data received over wireless from the remote wireless tunneling apparatus (denoted as remote.data), and (3) locally-generated signals/events such as timeouts (e.g., timeout_12 ms in Table 7).

Table 5 summarizes the list of all super-speed signaling information used. Table 6 shows the packet structure for transmitting signaling information over wireless. Super-speed signaling information is encoded and communicated as in-band payload over wireless. The signaling information may be sent over wireless whenever there is no super-speed packet data to be transmitted.

TABLE 5

Super-speed signaling information

| | Signaling | Encoded value (8 bit - binary) | Comment |
|---|---|---|---|
| 1 | RX_SIG_POWEROFF | 0000_00xx | 0 = Rx Valid,<br>1 = Rx Electrical Idle,<br>2 = Power Present |
| 2 | RX_SIG_LFPS | 0000_0100 | LFPS start |
| 3 | RX_SIG_DATA | 0000_0101 | Data start |
| 4 | RX_SIG_IDLE/RX_SIG_POWERON | 0000_0110 | Idle start |
| 5 | RX_DETECT_SUCCESS | 0001_0000 | Receive detection pass |
| 6 | RX_DETECT_FAIL | 0001_0001 | Receive detection fail |
| 7 | RX_LFPS_POLLING | 0010_0000 | LFPS end with type Polling LFPS |
| 8 | RX_LFPS_PING | 0010_0001 | LFPS end with type Ping LFPS |
| 9 | RX_LFPS_WARMRESET | 0010_0010 | LFPS end with type Warmreset LFPS |

TABLE 5-continued

Super-speed signaling information

| Signaling | Encoded value (8 bit - binary) | Comment |
|---|---|---|
| 10 RX_LFPS_U1EXIT | 0010_0011 | LFPS end with type U1 Exit LFPS |
| 11 RX_LFPS_U2EXIT | 0010_0100 | LFPS end with type U2 Exit LFPS |
| 12 RX_LFPS_U3WAKEUP | 0010_0101 | LFPS end with type U3 Wakeup LFPS |
| 13 RX_LFPS_ERROR | 0010_0110 | LFPS end with no valid LFPS type |
| 14 TSEQ_START | 0011_0000 | Start TSEQ |

TABLE 6

Signaling information packet structure

| Byte 3 | Byte 2 | Byte 1 | Byte 0 |
|---|---|---|---|
| K23.7 (EPF) | K26.8 (ESC) | K26.8 (ESC) | K26.8 (ESC) |
| Dxx.x | Dxx.x | Dxx.x | Dxx.x |

In Table 6, Dxx.x is the encoded signaling symbol—one of the encoded values from Table 5. Replicating Dxx.x four times is employed to improve resilience against wireless errors, in one embodiment.

Table 7 summarizes next states and transition conditions for the 25-state USB 3.0 super-speed state machine 631, It is designed to support USB3.0 super-speed link connectivity and link power management functionalities, according to one embodiment. Towards the bottom of the table are two global conditions that apply to multiple states and enable transition to two fixed states: POWER_OFF and SS.Disabled.Default.

TABLE 7

State transitions for USB3.0 super-speed state machine

| | State | Condition | Next state |
|---|---|---|---|
| 1 | POWER_OFF | (US && power_present) \|\| (DS && !remote.RX_SIG_POWEROFF) && wireless_link_up | SS.Disabled.Default |
| 2 | SS.Disabled.Default | !phy_status | Rx.Detect.Reset |
| 3 | SS.Disabled.Error | power_on_reset-(After "Sleep" event in the wireless apparatus, this is described later) | SS.Disabled.Default |
| 4 | Rx.Detect.Reset | (US && !lfps) | Rx.Detect.Remote |
| | | (DS && !lfps) | Rx.Detect.Active |
| 5 | Rx.Detect.Active | rx_detect_fail | Rx.Detect.Quiet |
| | | (US && rx_detect_pass) | Polling.LFPS |
| | | (DS && rx_detect_pass) | Rx.Detect.Remote |
| | | rx_detect_fatal | SS.Disabled.Error |
| 6 | Rx.Detect.Quiet | timeout_12ms | Rx.Detect.Active |
| 7 | Rx.Detect.Remote | (US && remote.RX_DETECT_SUCCESS) | Rx.Detect.Active |
| | | (DS && remote.RX_DETECT_SUCCESS) | Polling.LFPS |
| 8 | Polling.LFPS | US && compliance_done && timeout_360ms | SS.Disabled.Default |
| | | DS && compliance_done && timeout_360ms | Rx.Detect.Active |
| | | !compliance_done && timeout_360ms | Compliance Mode |
| | | remote.TSEQ_START | Polling.RxEQ |
| | | warm_reset | Rx.Detect.Reset |
| 9 | Polling.RxEQ | remote.data == TS1_ordered_set | PollingTraining |
| 10 | PollingTraining | US && remote.RX_SIG_IDLE | SS.Disabled.Default |
| | | warm_reset | Rx.Detect.Reset |
| | | idle_handshake && TS2_loopback | Loopback.Active |
| | | idle_handshake && TS2_hotreset | NonPollingTraining |
| | | idle_handshake && !TS2_loopback && ! TS2_hotreset | U0 |
| 11 | NonPollingTraining | US && remote.RX_SIG_IDLE | SS.Disabled.Default |
| | | warm_reset | Rx.Detect.Reset |
| | | idle_handshake && TS2_loopback | Loopback.Active |
| | | idle_handshake &&!TS2_loopback && ! TS2_hotreset | U0 |
| 12 | U0 | lgou1_success | U1 |
| | | lgou2_success | U2 |
| | | lgou3_success | U3 |

TABLE 7-continued

State transitions for USB3.0 super-speed state machine

| State | Condition | Next state |
|---|---|---|
|  | remote.data == TS1 | NonPollingTraining |
|  | US && remote.RX_SIG_IDLE | SS.Disabled.Default |
|  | warm_reset | Rx.Detect.Active |
|  | remote.data == TSEQ | PollingTraining |
| 13 U1 | warm_reset | Rx.Detect.Active |
|  | timeout_u2 | U2 |
|  | remote.data == TS1 | NonPollingTraining |
| 14 U2 | Lfps | U2_Exit |
| 15 U2_Exit | warm_reset | Rx.Detect.Reset |
|  | remote.data == TS1 | NonPollingTraining |
| 16 U3 | Lfps | U3_Resume |
|  | timeout_100ms | U3_RxDetect |
|  | RxDetectPass | U3 |
| 17 U3_RxDetect | RxDetectFail | Rx.Detect.Reset |
|  | Lfps | U3_Resume |
| 18 U3_Exit | warm_reset | Rx.Detect.Reset |
|  | remote.data == TS1 | NonPollingTraining |
| 19 Compliance Mode | warm_reset | Rx.Detect.Reset |
| 20 Loopback.Active | Lfps | Loopback.Exit |
|  | warm_reset | Rx.Detect.Reset |
| 21 Loopback.Exit | !lfps | Rx.Detect.Reset |
|  | timeout_2ms | SS.Disabled.Default |
| Any state | exittoPowerOFF | PowerOFF |
| Any state but U1/U2/U3 | DS && remote.RX_SIG_IDLE | SS.Disabled.Default |

DS = (id_dig == 0) //id_dig is UTMI pin
US = (id_dig == 1) // id_dig is UTMI pin
lfps = !rx_electrical_idle && !rx_val // Both are USB PHY pins
rx_detect_pass = phy_status&& (rx_status == 3'b011) // Both are USB PHY pins
rx_detect_fail = phy_status&& (rx_status != 3'b011)
warm_reset = US && (DATA == warm_reset) || DS && (remote.DATA == RX_LFPS_WARMRESET)
compliance_done = (state==ComplianceMode) && warm_reset; //Level signal; once set remains set
idle_handshake = ((DATA == IDLE)*8) && ((remote.DATA == IDLE)*16)
TS2_loopback = (DATA == TS2_loopback) || (remote.DATA == TS2_loopback)
TS2_hotreset = DS && (remote.DATA == TS2_hotreset) || US && (DATA == TS2_hotreset)
lgou1_success = LGO_U1->LAU->LPMA|Timeout
lgou2_success = LGO_U2->LAU->LPMA|Timeout
lgou3_success = LGO_U3->LAU->LPMA|Timeout
timeout_u2 = U2 Inactivity Timeout
tDisabledCount = (count_for_RxDetectFail == 10)
exittoPowerOFF = !WirelessLinkUp || (US && !PowerPresent || DS && remote.RX_SIG_POWEROFF)

At the bottom of Table 7, the terms used to describe the condition use names and symbols borrowed from the USB 3.0 specification and the PIPE interface specification. Also used in these equations is signaling information from Table 5. For example, remote.RX_DETECT_SUCCESS used in Row 7 of Table 7 is the "Receive Detection Pass" signaling received over wireless link from the remote wireless apparatus.

Implementing low power states for wireless tunneling apparatus saves power consumption in many usage scenarios, for example, entering low power state while waiting for USB device plugin (Sleep/W0 loop) or entering low power state while waiting for W2 exit or W3 exit. Note that in both these scenarios the low power state could last a long time, since the transitions in and out of these states are usually triggered at human timescale. It is therefore beneficial to design the wireless tunneling apparatus to support low power states for these scenarios.

In order to wake-up the apparatuses in low-power state, a separate low-frequency (LF) and low-power wireless data-path is implemented. The LF TX circuit 424 is used to transmit asynchronous signals across the wireless link. The USB digital logic asynchronously drives the signal SSU-Wakeup (or alternately HSUWakeup for USB 2.0) high whenever the USB PHY detects LFPS (low frequency periodic signaling) on the cable interface while the apparatuses are in U2 or U3 low power state. This asynchronous signal is transmitted using LF TX circuit 424 and under the control of the wireless component state-machine 480.

Likewise the signal SSWWakeup is driven by the LF RX circuit 446 whenever wakeup signal is detected over wireless link. This is used by the wireless component state machine 480 and USB Digital 404 to transition the apparatuses into an operational state U0.

Tables 8 and 9 describe the exemplary W2 entry/exit sequence and Sleep entry/exit sequence, respectively, according to one embodiment. The Initiator column in the tables use the following notations:

"Host": USB host or upstream USB hub (e.g., processing apparatus 110A)

"Device": USB peripheral or downstream USB hub (e.g., processing apparatus 110B)

"US-U": USB digital 404 on upstream side (e.g., wireless tunneling apparatus 120A)

"US-W": Wireless blocks on upstream side (e.g., wireless tunneling apparatus 120A)

"DS-U": USB digital 404 on downstream side (e.g., wireless tunneling apparatus 120B)

"DS-W": Wireless blocks on downstream side (e.g., wireless tunneling apparatus 120B).

In W2/W3 states, the digital clocks are stopped and mixed-signal/radio blocks are put in low-power state. However in Sleep mode the entire USB digital 404 (including state machines) and most of wireless blocks lose power. In an embodiment, there is a small always-ON digital state-machine that retains power even during Sleep.

TABLE 8

W2 entry/exit sequence for USB3.0 super-speed

| | Event | Initiator | Upstream Link State | Downstream Link State | Wireless Power State |
|---|---|---|---|---|---|
| | W2 entry sequence | | | | |
| 1 | lgou2_success | Host or Device | U0->U2 | U0->U2 | W0 |
| 2 | SSUPowerDown = W2 | DS-U and US-U | U2 | U2 | W0 |
| 3 | W2 request exchange over wireless | DS-W and US-W | U2 | U2 | W0 |
| 4 | WLinkW0Mode goes from 1 to 0 | DS-W and US-W | U2 | U2 | W2 |
| | W2 exit sequence - Host initiated | | | | |
| 1 | lfps (U2 Exit) | Host | U2->U2_Exit | U2 | W2 |
| 2 | SSUWakeup = 1 | US-U | U2_Exit | U2 | |
| 3 | Wireless Wakeup request | US-W | U2_Exit | U2 | |
| 4 | SSWWakeup = 1 drvLfps = 1 | DS-W DS-U | U2_Exit | U2->U2_Exit | W0 |
| 5 | lfps (Handshake) | Device | U2_Exit | U2_Exit | |
| 6 | RX_SIG_LFPS | DS-U | U2_Exit | U2_Exit | |
| 7 | RX_SIG_LFPS Rx @US | US-W | U2_Exit | U2_Exit | |
| 8 | drvLfps = 1 | US-U | U2_Exit | U2_Exit | |
| 9 | LFPS end sequence | | | | |
| 10 | TS1 Training | Host and Dev | U2_Exit-> NonPolling Training | U2_Exit-> NonPolling Training | W0 |
| | W2 exit sequence - Device initiated | | | | |
| 1 | lfps (U2 Exit) | Device | U2 | U2->U2_Exit | W2 |
| 2 | SSUWakeup = 1 | DS-U | U2 | U2_Exit | |
| 3 | Wireless Wakeup request | DS-W | U2 | U2_Exit | |
| 4 | SSWAsyncWakeup = 1 drvLfps = 1 | US-W US-U | U2->U2_Exit | U2_Exit | W0 |
| 5 | lfps (Handshake) | Host | U2_Exit | U2_Exit | |
| 6 | RX_SIG_LFPS | US-U | U2_Exit | U2_Exit | |
| 7 | RX_SIG_LFPS Rx @US | DS-W | U2_Exit | U2_Exit | |
| 8 | drvLfps = 1 | DS-U | U2_Exit | U2_Exit | |
| 9 | LFPS end sequence | | | | |
| 10 | TS1 Training | Host and Dev | U2_Exit-> NonPolling Training | U2_Exit-> NonPolling Training | W0 |

TABLE 9

Sleep entry/exit sequence for USB3.0 super-speed

| | Event | Initiator | Upstream Link State | Downstream Link State | Wireless Power State |
|---|---|---|---|---|---|
| | Sleep entry sequence | | | | |
| 1 | USB Rx detect attempt to disconnect (SSDisconnect = 1) | | Any of Rx.Detect state | Any of Rx.Detect state | W0 |
| 2 | 150 ms timeout with SS.Disconnect = 1 | DS-W and US-W | Any of link Init state | Any of Rx.Detect state | W0 |
| 3 | Sleep request exchange over wireless | DS-W and US-W | Any of Rx.Detect state | Any of Rx.Detect state | W0 |
| 4 | Entry to sleep state WirelessLinkUp = 0 | | Any of Rx.Detect state-> PowerOFF | Any of Rx.Detect state-> PowerOFF | W0->Sleep |
| | Sleep exit sequence - Host initiated | | | | |
| 1 | 1 sec sleep timeout | DS-W and US-W | No power | No power | Sleep |
| 2 | Power up | DS-W and US-W | | | Sleep->W0 |

TABLE 9-continued

Sleep entry/exit sequence for USB3.0 super-speed

| | Event | Initiator | Upstream Link State | Downstream Link State | Wireless Power State |
|---|---|---|---|---|---|
| 3 | Normal power up sequence | All blocks | | | W0 |

USB 2.0 State Machine

The USB2.0 state machine 631 for HS/FS/LS data is adapted and optimized starting from the Reset Protocol State Machine (RPSM) described in the USB 2.0 specification. It handles high-speed, full-speed, and low-speed operations using the $D^+/D^-$ lines.

Table 10 shows signaling information generated by the USB 2.0 state-machine. The encoding of the bytes for wireless communication uses the same scheme as super-speed (described in Table 6).

TABLE 10

USB 2.0 signaling information

| | Signaling | Encoded Value (8 bit - binary) | Comment |
|---|---|---|---|
| 1 | LINE_STATE_SE0 | 0000_0000 | Change of line state to SE0 at remote Slingshot UTMI |
| 2 | LINE_STATE_0 | 0000_0010 | Change of line state to differential "0" at remote Slingshot UTMI |
| 3 | LINE_STATE_1 | 0000_0001 | Change of line state to differential "1" at remote Slingshot UTMI |
| 4 | LINE_STATE_SE1 | 0000_0011 | Change of line state to SE1 at remote Slingshot UTMI |
| 5 | HostDisconnect | 0001_0001 | HostDisconnect 0->1 change at remote Slingshot UTMI. Valid for DS only |
| 6 | HostConnect | 0001_0000 | HostDisconnect 1->0 change at remote Slingshot UTMI. Valid for DS only |
| 7 | VBUS_ON | 0010_0001 | PowerPresent 0->1 transition at remote Slingshot |
| 8 | VBUS_OFF | 0010_0000 | PowerPresent 1->0 transition at remote Slingshot |

Table 11 summarizes the next state and transition condition for the 17-state USB 2.0 state machine 631. This state-machine is simpler than the one for super-speed, since super-speed operation implements a more sophisticated power management. The USB 2.0 state machine 631 on the other hand needs different states for supporting HS, FS, and LS—as evident from a few states replicated three times in the Table below. Towards the bottom of the table there are three global conditions that apply to multiple current states. They enable transition to three fixed states: Poweroff, Disconnected, and Reset_SE0.

TABLE 11

States & transitions for USB 2.0 state-machine

| | Current State | Condition | Next State |
|---|---|---|---|
| 1 | Poweroff | sigPowerOn | Disconnected |
| 2 | Disconnected | sigHostConnect | Connected |
| 3 | Connected | sigline_host_SE0 | Reset_SE0 |
| 4 | Reset_SE0 | sigline_dev_1 | Reset_FS |
| | | sigline_dev_0 | LS_Default |
| 5 | Reset_FS | sigline_dev_K | Reset_chirpK |
| | | timeout_10ms | FS_Default |
| 6 | Reset_chirpK | !sigline_dev_K | Reset_JK_handshake |
| | | timeout_2.5us | FS_Default |
| 7 | Reset_JK_handshake | sigline_host_SE0 | Reset_SE02 |
| 8 | Reset_SE02 | !sigline_host_SE0 | HS_Default |
| 9 | HS_Default | idle_more_than_3ms | HS_Suspend |
| 10 | FS_Default | idle_more_than_3ms | FS_Suspend |

TABLE 11-continued

States & transitions for USB 2.0 state-machine

| | Current State | Condition | Next State |
|---|---|---|---|
| 11 | LS_Default | idle_more_than_3ms | LS_Suspend |
| 12 | HS_Suspend | (Remote.LineState==K) ||(Line State ==K) | HS_Suspend_Exit |
| 13 | HS_Suspend_Exit | (Remote.LineState==J) ||(LineState==J) | HS_Default |
| 14 | FS_Suspend | (Remote.LineState==K) ||(LineState==K) | FS_Suspend_Exit |
| 15 | FS_Suspend_Exit | (Remote.LineState==J) || (LineState==J) | FS_Default |
| 16 | LS_Suspend | (Remote.LineState==K) || (LineState==K) | LS_Suspend_Exit |
| 17 | LS_Suspend_Exit | (Remote.LineState==J) || (LineState==J) | LS_Default |
| | Any State | sigPowerOff | Poweroff |
| | Any State | sigHostDisconnect | Disconnected |
| | Any State other than Reset states | sigline_host_SE0 | Reset_SE0 |

DS = (IdDig == 0) //IdDig is UTMI pin
US = (IdDig == 1) // IdDig is UTMI pin
sigPowerOn = WirelessLinkUp && (US && PowerPresent || DS && remote.VBUS_ON)
sigPowerOff = !WirelessLinkUp || (US && !PowerPresent || DS && remote.VBUS_OFF)
sigHostConnect = US && remote. HostConnect || DS && !HostDisconnect
sigHostDisconnect = US && remote. HostDisconnect || DS && HostDisconnect
sigline_host_SE0 = DS &&remote.LINE_STATE_SE0 || US && LINESTATE_SE0
sigline_host_1 = DS && remote.LINE_STATE_1 || US && LINESTATE_1
sigline_host_0 = DS && remote.LINE_STATE_0 || US && LINE_STATE_0
sigline_host_J = (FS || HS) && sigline_host_1 || LS && sigline_host_0
sigline_host_K = (FS || HS) && sigline_host_0 || LS && sigline_host_1
sigline_dev_1 = DS && LINE_STATE_1 || US && remote.LINE_STATE_1
sigline_dev_0 = DS && LINE_STATE_0 || US && remote.LINE_STATE_0
sigline_dev_J = (FS ||HS) && sigline_dev_1 || LS && sigline_dev_0
sigline_dev_K = (FS ||HS) && sigline_dev_0 || LS && sigline_dev_1

At the bottom of Table 11, the terms used in Condition use names and symbols borrowed from the USB 2.0 specification and the UTMI interface specification. Also used in these equations is USB 2.0 signaling information from Table 10.

Table 12 and 13 describe W3 entry/exit and Sleep entry/exit sequences for high-speed, full-speed, and low-speed operations. In these tables the "xx_" prefix denotes either one of HS, FS, and LS.

As described earlier, the wireless design supports the power states: W0, W2, W3, and Sleep. The states W0, W2, and W3 get mapped to USB3.0 super-speed states U0, U2, and U3. In one embodiment, the apparatus does not power down wireless blocks in U1 state since the exit latency requirement for U1 is very short. The "suspend" power state in USB 2.0 is mapped to W3. This is because the "suspend-resume" exit latency requirement is comparable to that of super-speed U3.

In one embodiment, the wireless tunneling apparatus can be used on upstream side of a USB 3.0 hub, thereby utilizing both USB3.0 super-speed and USB 2.0 data transfers simultaneously. Therefore, in this embodiment, the power state W3 is entered only after checking both the USB 2.0 state machine 631 and the USB3.0 super-speed state machine 621. For example, W3 is entered only if the USB 3.0 super-speed link is in U3 or Disabled state and the USB 2.0 link is in Suspend state. Likewise the Sleep state is entered only if USB3.0 super-speed link is in Disabled state and USB 2.0 link is in Disconnected state.

TABLE 12

W3 entry/exit sequence for USB 2.0 suspend-resume

| | Event | Initiator | Upstream Link State | Downstream Link State | Wireless Power State |
|---|---|---|---|---|---|
| | | | W3 entry sequence | | |
| 1 | IDLE > 3 ms | Host | xx_Default-> xx_Suspend | xx_Default-> xx_Suspend | W0 |
| 2 | USB state-machine asserts suspend signal to wireless design | DS-U and US-U | xx_Suspend | xx_Suspend | W0 |
| 3 | W3 request exchange over wireless | DS-W and US-W | xx_Suspend | xx_Suspend | W0 |
| 4 | WLinkW0Mode = 1->0 | DS-W and US-W | xx_Suspend | xx_Suspend | W0->W3 |
| | | | W3 exit sequence - Host initiated | | |
| 1 | Linestate == K for 20 ms | Host | xx_Suspend-> xx_Suspend_Exit | xx_Suspend | W3 |
| 2 | HSUWakeup = 1 | US-U | xx_Suspend_Exit | xx_Suspend | |
| 3 | Wireless Wakeup request | US-W | xx_Suspend_Exit | xx_Suspend | |

TABLE 12-continued

W3 entry/exit sequence for USB 2.0 suspend-resume

| | Event | Initiator | Upstream Link State | Downstream Link State | Wireless Power State |
|---|---|---|---|---|---|
| 4 | HSWWakeup = 1 drvResume = 1 | DS-W DS-U | xx_Suspend_Exit | xx_Suspend-> xx_Suspend_Exit | W3->W0 |
| 5 | Idle (post resume) | Host | xx_Default | xx_Suspend_Exit | W0 |
| 6 | sigline_host_J | US-U | xx_Default | xx_Default | W0 |
| | W3 exit sequence - Device initiated | | | | |
| 1 | Linestate == K for 1-15 ms | Device | xx_Suspend | xx_Suspend-> xx_Suspend_Exit | W3 |
| 2 | HSUWakeup = 1 | DS-U | xx_Suspend | xx_Suspend_Exit | |
| 3 | Wireless Wakeup request | DS-W | xx_Suspend | xx_Suspend_Exit | |
| 4 | WAsyncWakeup = 1 DrvResume = 1 | US-W and US-U | xx_Suspend-> xx_Suspend_Exit | xx_Suspend_Exit | W3->W0 |
| 5 | Idle (post resume) | Device | xx_Suspend_Exit | xx_Default | W0 |
| 6 | Sigline_host_J | DS-U | xx_Default | xx_Default | W0 |

TABLE 13

Sleep entry/exit sequence for USB 2.0 disconnect-connect

| | Event | Initiator | Upstream Link State | Downstream Link State | Wireless Power State |
|---|---|---|---|---|---|
| | Sleep entry sequence | | | | |
| 1 | Host or device disconnects or powers off | Host or Device | | | W0 |
| 2 | USB state-machine asserts disconnect signal to wireless design | DS-U or US-U | PowerOff/ Disconnect | PowerOff/ Disconnect | W0 |
| 3 | 150 ms timeout with disconnect = 1 | DS-W and US-W | PowerOff/ Disconnect | PowerOff/ Disconnect | W0 |
| 4 | Sleep request exchange over wireless | DS-W and US-W | PowerOff/ Disconnect | PowerOff/ Disconnect | W0 |
| 5 | Entry to Sleep; WirelessLinkUp = 0 | | Lose Power | | Sleep |
| | Sleep exit sequence - Host initiated (USB 2.0 Poll for Connect) | | | | |
| 1 | 1 sec sleep timeout | DS-W and US-W | No power | No power | Sleep |
| 2 | Power up | DS-W and US-W | | | Sleep-> W0 |
| 3 | Normal power up sequence | All blocks | | | W0 |

Upon reading this disclosure, those of skill in the art will appreciate still additional alternative embodiments through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the scope described herein.

What is claimed is:

1. A local wireless tunneling apparatus that operates in conjunction with a remote wireless tunneling apparatus to wirelessly tunnel communications between a remote processing apparatus and a local processing apparatus while maintaining compliance of the communications between the remote processing apparatus and the local processing apparatus with a wired communication protocol, the local wireless tunneling apparatus comprising:

a wireless receiver configured to receive a wireless receive signal from the remote wireless tunneling apparatus, the wireless receiver to downconvert the wireless receive signal to generate a baseband signal from the wireless receive signal;

a processing component state machine configured to predict a remote processing state of the remote processing apparatus based on the baseband signal and one or more prior local processing states of the local processing apparatus; and an interface circuit coupled to the local processing apparatus, the interface circuit configured to (i) generate an output signal conforming to the wired communication protocol based on the predicted remote processing state and the baseband signal and (ii) provide the output signal to the local processing apparatus through the wired communication protocol.

2. The local wireless tunneling apparatus of claim 1, further comprising:
a wireless transmitter configured to (i) receive an input signal from the local processing apparatus to generate another baseband signal, (ii) upconvert said another baseband signal to generate a wireless transmit signal and (iii) transmit the wireless transmit signal.

3. The local wireless tunneling apparatus of claim 2, wherein the processing component state machine controls a power state of the receiver or the transmitter based on one or more of:
(a) current state of the processing component state machine,
(b) inputs received from the local processing apparatus, and
(c) the predicted remote processing state.

4. The local wireless tunneling apparatus of claim 2, wherein the processing component state machine is further configured to map one or more local processing states of the local processing apparatus to a single state of the processing component state machine, and generate a state signal indicative of a local processing state of the local processing apparatus based on the single state, and wherein the transmitter is configured to encode the baseband signal with the state signal indicative of the local processing state of the local processing apparatus.

5. The local wireless tunneling apparatus of claim 1, further comprising:
a wireless component state machine configured to determine a wireless component state of the wireless receiver based on its own current state and the predicted remote processing state of the remote processing apparatus.

6. The local wireless tunneling apparatus of claim 5, wherein the wireless component state machine controls an operation mode of the wireless receiver according to the wireless component state determined based on its own current state and the predicted remote processing state of the remote processing apparatus.

7. The local wireless tunneling apparatus of claim 6, wherein the wireless component state is determined based on its own current state and the predicted remote processing state.

8. The local wireless tunneling apparatus of claim 1, wherein the baseband signal is encoded with a state signal indicative of a prior state of the remote processing apparatus, and wherein the processing component state machine is configured to predict the remote processing state of the remote processing apparatus based on the state signal of the baseband signal.

9. The local wireless tunneling apparatus of claim 1, wherein the processing component state machine is configured to predict the remote processing state of the remote processing apparatus based on a portion of the baseband signal corresponding to the wireless receive signal.

10. A method for wirelessly tunneling communications between a local processing apparatus and a remote processing apparatus while maintaining compliance of the communications between the local processing apparatus and the remote processing apparatus with a wired communication protocol, the method comprising:
receiving, by a wireless receiver, a wireless receive signal from a remote wireless tunneling apparatus;
downconverting, by the wireless receiver, the wireless receive signal to generate a baseband signal from the wireless receive signal;
predicting, by a processing component state machine, a remote processing state of the remote processing apparatus based on the baseband signal and one or more prior local processing states of the local processing apparatus;
generating, by an interface circuit coupled to the local processing apparatus, an output signal conforming to the wired communication protocol based on the predicted remote processing state and the baseband signal; and
providing, by the interface circuit, the output signal to the local processing apparatus through the wired communication protocol.

11. The method of claim 10, further comprising:
receiving, by a wireless transmitter, an input signal from the local processing apparatus to generate another baseband signal;
upconverting, by the wireless transmitter, said another baseband signal to generate a wireless transmit signal; and
transmitting, by the wireless transmitter, the wireless transmit signal.

12. The method of claim 11, further comprising:
controlling, by the processing component state machine, a power state of the receiver or the transmitter based on one or more of:
(a) current state of the processing component state machine,
(b) inputs received from the local processing apparatus, and
(c) the predicted remote processing state.

13. The method of claim 11, further comprising:
mapping, by the processing component state machine, one or more local processing states of the local processing apparatus to a single state of the processing component state machine;
generate, by the processing component state machine, a state signal indicative of a local processing state of the local processing apparatus based on the single state; and
encoding, by the transmitter, the baseband signal with the state signal indicative of the local processing state of the local processing apparatus.

14. The method of claim 10, further comprising:
determining, by a wireless component state machine, a wireless component state of the wireless receiver based on the predicted remote processing state of the remote processing apparatus.

15. The method of claim 14, further comprising:
controlling, by the wireless component state machine, an operation mode of the wireless receiver according to the wireless component state determined based on the predicted remote processing state of the remote processing apparatus.

16. The method of claim 15, wherein the wireless component state is determined based on the predicted remote processing state.

17. The method of claim 10, wherein the baseband signal is encoded with a state signal indicative of a prior state of the remote processing apparatus, and wherein the processing component state machine is configured to predict the remote processing state of the remote processing apparatus based on the state signal of the baseband signal.

18. The method of claim 10, wherein the processing component state machine is configured to predict the remote processing state of the remote processing apparatus based on a portion of the baseband signal corresponding to the wireless receive signal.

* * * * *